United States Patent [19]
Tuttle et al.

[11] Patent Number: 6,109,591
[45] Date of Patent: Aug. 29, 2000

[54] WIDE RANGE PROPORTIONAL FLOW CONTROL VALVE

[76] Inventors: James D. Tuttle, 1009 W. 13th St., Houston, Tex. 77008; Robert J. Schwartz, 5446 Queensloch, Houston, Tex. 77096

[21] Appl. No.: 08/738,016

[22] Filed: Oct. 25, 1996

[51] Int. Cl.$^7$ ..................................................... F16K 1/52
[52] U.S. Cl. ...................................... 251/208; 251/315.01
[58] Field of Search .................................... 251/208, 209, 251/304, 315.01

[56] References Cited

U.S. PATENT DOCUMENTS

| | | | |
|---|---|---|---|
| 4,989,833 | 2/1991 | Polon | 251/208 X |
| 5,551,467 | 9/1996 | Booth et al. | 251/209 X |

*Primary Examiner*—Kevin Lee
*Attorney, Agent, or Firm*—James L. Jackson; Mayor, Day, Caldwell & Keeton L.L.P

[57] ABSTRACT

A continuous flow type proportional flow control valve having a very wide controllable flow range and having a valve seat port design permitting a continuous, stable closed loop control to be achieved. The flow port design cooperates with a simple cylindrical flow passage of a movable valve element and provides the valve with a very wide flow control range and the ability to smoothly control the opening, modulation, and closing of the valve to eliminate undesirable hydraulic shock which is an undesirable characteristic of pulse operated flow control systems. The flow controlling seat has a flow controlling port therein that cooperates with the flow port of the closure to define an effective valve opening that is proportionally variable over a wide range of closure movement. The seat port is provided with an extremely narrow elongate slot section less than 1/50th of the maximum width of the aperture. The seat opening also defines a large final, generally circular orifice section having a radius comparable to the radius of the bore in the ball. Further, the seat opening is defined by a transition between the elongate narrow slot and final circular orifice section in the form of two diverging curves offering an exponential flow characteristic of the form $K=N^x$.

5 Claims, 6 Drawing Sheets

WIDE RANGE PROPORTIONAL FLOW CONTROL VALVE

BACKGROUND OF THE INVENTION

1. Field of the Invention

This invention relates generally to a method and apparatus for precisely controlled volumetric injection of selected fluid compositions through a flow control valve for any of a wide variety of purposes. More particularly, the present invention concerns the provision of a flow control valve having relatively movable flow control elements which are capable of cooperatively defining a flow control orifice opening having a valve closed condition blocking the flow of fluid through the valve, a full open condition for allowing maximum flow of fluid through the control valve and wherein the flow port and flow control aperture of the valve cooperate to provide for exponential percent change of the cross-sectional area of the flow control orifice per unit of relative valve element motion. In circumstances where the valve is provided for injection of various fuel additive compositions, the control valve mechanism provides for continuous flow type additive injection, wherein the valve has a very wide range of flow control and has a port design significantly simplifying closed loop control. In particular, as compared to other valves designed for static control, the flow control valve and method of flow control of this invention provides a smooth and continuous controlled change in flow capability per unit change in motion of the movable valve element. In contrast with conventional valve designs wherein the orifice area changes a relatively constant amount per unit increment movement, the wide range valve orifice area of the flow control valve of this invention changes area exponentially per unit increment of movement. The exponential change in area as opposed to linear change in area, permits stable closed-loop control over a very wide flow range. For example, valves with a flow control range of 70,000:1, and a substantially constant percent increment of area per unit increment of movement range of 462:1 have been produced by the inventors according to the teachings of the present invention. Additionally the inventors have developed alternative manufacturing techniques that could extend the flow control range considerably beyond the 70,000:1 control range that the inventors have achieved, which could extend the exponential range to cover substantially the entire flow control range.

2. Description of the Prior Art

Most petroleum based fuels such as gasoline and diesel are required by Federal law to be provided to the end-user only after the addition of certain additives. These additives color or dye untaxed diesel fuel, keep fuel injectors or carburetors clean, reduce or prevent intake valve deposits, or may otherwise enhance the performance as a fuel.

While some of these additives may be introduced at a refinery, or during the transportation process, many are introduced at bulk fuel terminals before the fuel is delivered to a retailer for sale to the end-user. Reasons for introduction at a terminal may be for economic, marketing reasons, or convenience. Each company that sells fuel under its brand name selects a particular additive that suits its marketing objectives and meets any Federally mandated requirements. Bulk (unadditized) fuel is typically supplied to a bulk fuel terminal. Usually, the regular unleaded grade of bulk gasoline is common to all brands sold. A premium grade may be proprietary to a brand or it may support the needs of several brands. For mid-grade, either mid-grade stock or a blend of premium and regular stock may be used. At the terminal, as a truck pulls up to supply the needs for a specific brand, bulk gasoline together with a carefully metered amount of the selected additive is delivered into a compartment on the truck. For a particular brand of product, the amount of additive may be the same for all grades or may vary with the grade. The amounts used typically range from about 0.1 to 1.0 gallon of additive per 1000 gallons of fuel (0.01 to 0.1% by volume).

These additives are made by a number of manufacturers. The additives may vary substantially one from another in viscosity and other flow characteristics as well as chemical constituents. Further, as temperature changes from summer to winter, the viscosity can change widely. The additive flow characteristics can vary from equivalence to gasoline to equivalence to heavy gear lubricant when the temperature ranges from 120° F. to −40° F. In addition to the changes in viscosity, differential pressures can vary as the additive and fuel supply systems support one or a number of active loading stations of a bulk fuel handling facility.

Extensive research has been conducted on various means for introducing precisely metered amounts of additives in liquid form into a fuel stream as it is dispensed from a bulk fuel terminal facility and loaded into a tank truck compartment. A common practice in the industry has been to use a pulse-operated additive injection system based on the use of a solenoid operated valve either to control the number of pulses of fixed volumes of additive or to control the duration of periodic pulses of additive. While these methods are in wide use, their long-term reliability to consistently deliver precise amounts of additive is questionable. The periodic pulsing with fast-rising and fast-falling pressure pulses that occurs in pulse-operated additive injection systems produces repetitive hydraulic shock, known as hydraulic "hammering" throughout the piping system, causing leaks and damage to connected components, such as joints and seals. Cavitation, which may occur under certain conditions, can cause additional system damage. The wide variations in flow characteristics of the various additives cause some of these devices to be operationally incapable of delivering the required precise amounts of additive at all times. These additive materials are relatively expensive. Furthermore, they employ active solvents in order to be able to accomplish their objective. This places severe limitations on the choice of compatible materials. Contamination of the environment from leaks is very undesirable. Excess flow due to leaking seals results in a significant economic loss in addition to potentially introducing amounts of additive that can be significantly in excess of the maximum allowable amounts, amounts that, if used on a consistent basis by motorists, might cause engine damage.

It is desirable therefore to provide an additive injection system that is simple, reliable, and operable with additives that have a wide variation in flow characteristics. It is also desirable to provide a continuous-flow valve having a very wide controllable flow range that is so controlled in its design that stable closed loop control can be reliably achieved.

The amount of fuel that is to be delivered into each compartment on the fuel delivery truck is known. This is preset into a "count-down" counter that terminates the delivery when the preset amount is reached. However, while the preset amount is "known" to the fuel delivery system, it frequently is not available to the additive delivery system. Thus, the additive delivery must be related to the fuel delivery, which is available. The fuel delivery rate is not constant, for many reasons, including varying supply pressures, and the stage of delivery at any load position such as ramping-up and ramping-down high volume product flow. The necessity to maintain an essentially constant ratio of additive to product delivery (constant concentration), with the possibility of premature shutoff for safety reasons, makes it essential to be able to control the additive delivery rate over a significant range. Further, since the additive control valve requires finite time to open, change, and close, these time periods must be factored into the control process to assure a constant additive concentration throughout the fuel delivery process.

In addition to the above, the valve should have the capability of controlling in succession the injection of different additives at different injection rates as brands change for successive product loads.

While a wide flow range can be achieved using a bank of valves of differing flow capabilities, switching from one valve to another can be very difficult to effectively control as the required controlled flow varies from the range of one valve to that of another and back again, changing every few seconds as dynamic pressures of product and additive in a terminal vary.

For smoothness of control, minimum hardware, and minimum system complexity (and thus maximum reliability) it was a principal objective to design a single controllable valve with a very wide flow control range and the ability to smoothly control the opening, modulation, and closing of the valve to eliminate undesirable hydraulic shock, characteristic of pulse operated systems.

Extensive research has suggested several types of flow control valve constructions that held promise as possible candidates. For essentially static operation, where a valve is adjusted to a particular flow capability and essentially left in that configuration for an extended period, a variety of types could be considered. Various concerns regarding reliability, safety, ease of control, and ability to manufacture narrowed the choice. For ease of reliable, consistent closed-loop control, it was desirable for the valve to have an exponential change in flow for a unit increment of movable valve element motion. While analysis suggested how an orifice could be designed to achieve the desired control characteristic, no currently available manufacturing technique was known to have been used to produce it.

SUMMARY OF THE INVENTION

It is a principal feature of the present invention to provide a novel wide range proportional flow control valve that achieves desired flow control characteristics, particularly suitable for continuous closed loop control.

It is also a feature of the present invention to provide a novel wide range flow control valve wherein over a majority of the range of relative motion of flow controlling elements, such as a fixed valve seat and a movable valve element for example, from the closed position to the full open position, a flow port in one valve element and a flow controlling aperture in the other valve element cooperatively define a flow controlling orifice having an area that increases substantially exponentially per unit of relative motion.

It is another feature of the present invention to provide a wide range flow control valve wherein any end range of relative motion of a flow port and a flow controlling aperture between the closed and full open positions thereof which may not have substantially exponential change per unit of relative motion be minimized.

It is a further feature of the present invention to provide a novel proportional flow control valve having a wide flow control range and also having the capability of smoothly controlling the opening, modulation and closing of the valve to avoid the occurrence of hydraulic shock during valve operation.

It is another feature of the present invention to provide a novel wide range proportional flow control valve that is designed to facilitate ease of manufacture and which will result in repeatable flow and control characteristics amongst like units.

It is an even further feature of this invention to provide a novel wide range proportional flow control valve having a fixed valve element and a movable valve element and wherein either of the valve elements may be provided with a flow control aperture designed for achieving fluid flow control according to the present invention.

It is also a feature of this invention to provide a novel wide range proportional flow control valve which may conveniently take the form of a ball valve, plug valve, sleeve valve, slide valve or many types of valves having a fixed valve element and a movable valve element.

Briefly, the various features of the present invention are realized through the provision of a proportional flow control valve having a valve body within which is positioned a closure element of conventional nature and which may take the form of many types of valve mechanisms having a fixed valve element with a flow passage or port and a movable valve element having a flow passage or port and wherein one port may be moved relative to the other. Either or both of the valve elements may be provided with a flow control aperture so that, when the ports are selectively positioned in communicating relation, controlled volumetric flow of fluid through the valve is permitted. Examples of suitable valve types may include a rotatable ball or plug closure, a sleeve type closure, a gate type closure, etc. The flow controlling apparatus of the valve is established by a first flow controlling element defining a flow controlling port and which cooperates with the flow port of a second flow controlling element, when the flow controlling elements are relatively movable, to define an effective flow controlling aperture that is exponentially variable over a majority of the range of relative movement and minimizes the potential for any non-exponential orifice area variation upon initial orifice opening and near the fully open condition of the flow control orifice. The flow controlling aperture defines an extremely narrow section which may be an elongate slot section and also defines a large final, section having a shape and size chosen for maximum area and flow rate. It is the composite effect of the two which effects the exponential characteristic; typically this is the intersection of a simple shape, such as a round bore or a straight edge, with the flow controlling aperture. But the present invention is clearly not limited to such, because two special shapes could be used to the same effect. In any case, a point would occur where the maximum area of one was fully uncovered. After this point, the geometry and size of the second becomes moot, as long as sufficient geometry remains in the second element to fully close the cooperative orifice.

The extent of the first relative to the second, or the second relative to the first, is typically minimally limited only by cooperatively uncovering the maximum area. In certain cases, to maximize range at the expense of a trivial amount of total flow, a portion of the extremely small end of one cooperative orifice may become covered. Practically this would mean that the critical flow response is defined by the first intersecting flow controlling shapes; the last intersecting shapes are not of interest except in terms of maximal flow. Once the first intersecting shapes are fully engaged so as to permit maximum flow, the extent and shape of the last edges need not even intersect. One intersection provides the flow control. Further, the Further, in the preferred embodiment, a single flow controlling aperture is defined by two closed ends connected by two diverging curves, having the appearance of an a transition between the elongate narrow slot with a transition to a final wide orifice section, the total flow controlling aperture defining an exponential flow characteristic. Alternatively, for practical manufacturing considerations, the flow controlling aperture may take the form of a parallel sided elongate slot or a diverging elongate slot and two diverging radii in transition to a final wide orifice section offering a close approximation to an exponential flow characteristic. In any case, for wide range, the elongate slot is an essential characteristic and, the exponential flow characteristic created or approximated is of the form $K=CN^x$, where K=total area C is a constant N is the total area per unit increment in movement; and the value represents the number of unit increments of movement, which may or may not be whole number increments and may represent any position within the range of the valve. By example, x can be in units of linear motion, as in thousandths of an inch or in units of rotary motion, as in degrees. In this case, the cooperative flow controlling aperture last intersecting shape and size is chosen purely for a balance between manufacturing convenience, flow control range and total flow capability.

It should be noted that desirably, for the simple control, N is a constant value. However, to facilitate altering the control characteristic, the value N may be adjusted in certain portions of the movement range. By example, at the closed end, as the just-open condition begins, the value N becomes infinite and rapidly decreases to a value determined by the character of the exponential shape. The employment of a parallel sided elongate slot to facilitate manufacture or a diverging sided elongate slot can also be used to vary the control characteristic in the just-open region to better control the opening transient. An elongate slot, having parallel or not perfectly exponentially diverging sides, will have a differing value of N over part of its range of employment and can be used to alter the value K in this region. The flare of the wide end can be adjusted to alter the value of N near the full-open position. Changing the value N in portions of the range of movement can be used to alter the closed loop response.

The two endpoints, at the just-open end and just before the full-open condition is reached, are accompanied by significant variations in the value N. With suitable design, these regions are minimized, thus extending the range over which stable closed-loop control may be achieved.

As mentioned above, the valve is comprised of a fixed element with a flow passage or port and a movable element containing a flow passage or port, or in the alternative, two movable flow controlling elements, wherein one port can be moved relative to the other. The movable valve elements can be moved to or from a position where the two ports have no degree of coincidence; there is no flow passage, they are blocked, hence there is no flow. This is referred to as the "closed position". The movable valve elements may be moved to or from a position where the ports are aligned to achieve a maximum flow capability. This is referred to as the "full open position" of the valve. For flow control purposes the movable valve element is capable of being moved continuously between the closed position and the full open position so as to vary the flow continuously from nearly zero to nearly maximum. The relatively movable flow controlling elements are adapted to be located at a desired relative position so that the effective flow controlling orifice that is defined by coincidence of the flow port and the flow controlling aperture will permit the flow of fluid at a desired rate of flow. The flow port and flow controlling aperture of the relatively movable valve elements are so designed that over virtually all of the range of relative motion of the flow port and flow controlling aperture the flow controlling orifice that is cooperatively defined by coincidence thereof, and thus the fluid flow that is permitted through the flow control orifice, changes substantially exponentially per unit of relative motion of the relatively movable flow control elements.

One of the ports of the fixed and movable valve elements may be selected to be of a conveniently produced shape, such as a round bore, straight line, etc. The other port of the valve may define an aperture shaped and oriented so that as the movable element is moved from the closed position toward the full open position, the coinciding port area increases exponentially per unit of motion until the full open position is reached.

The maximum dimension end of the flow control aperture may have a circular end matching the bore of the opposing port, or it might be straight to match a straight opposing port configuration, but typically will match the corresponding edge of the flow port in size, shape, and form. While for minimum aperture size and maximum flow, the flow controlling aperture and flow port may be of the same size, shape and form, such is not intended to limit the spirit and scope of this invention. The maximum dimension end of the flow controlling aperture may be of differing size, shape or form as compared with the size, shape or form of the flow port as long as the effective dimension of the flow control orifice defined thereby changes substantially exponentially per unit of motion except in the minimal regions of flow control at the initial opening condition and near full-open condition of the flow control orifice.

The critical elements are a specially shaped aperture; and which provides exponential flow characteristics when mated with a port that blocks or coincides. Either, or both, could be moved during valve opening and closing, as long as there is motion of one relative to the other. Thus, the control valve mechanism may conveniently be provided in the form of a gate valve, slide valve, rotary ball valve, rotary plug valve, sleeve valve, etc. Any of these valve types, using the horn shaped flow control aperture, could give the desired flow control characteristics.

FUNCTIONAL REQUIREMENTS IN A PETROLEUM TERMINAL ENVIRONMENT

With the foregoing in mind, the following control valve flow requirements were established:

Minimum flow: 0.1 gallons per minute with 90 psi pressure differential flowing 1 centistoke additive;

Maximum flow: 2.0 gallons per minute with 30 psi pressure differential flowing 900 centistoke additive;

Exponential control characteristic in the range of approximately 10% per degree (N=1.10).

ADDITIONAL FUNCTIONAL REQUIREMENTS:

Materials fully compatible with all fuel additives

Actuation suitable for continuous control

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof It is to be noted however, that the appended drawings illustrate only typical embodiments of this invention and are therefore not to be considered limiting of its scope, for the invention may admit to other equally effective embodiments.

In the Drawings.

DETAILED DESCRIPTION OF PREFERRED EMBODIMENT

Figure 1:
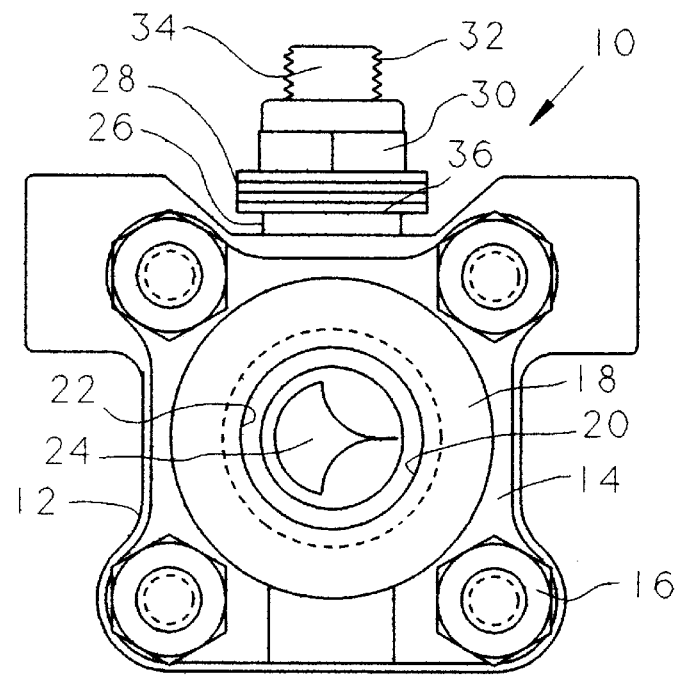
FIG. 1 is an elevational view of a ball type flow control valve having a flow controlling aperture in the seat thereof which is constructed in accordance with the present invention and which is designed to accomplish a very wide flow control range at varying differential pressure while maintaining desirable proportional control characteristics.

Referring now to the drawings and first to FIG. 1, a ball valve is shown generally at 10 having a valve body 12 which may be defined by body sections 14 that are secured in assembly by bolts 16. The valve body defines opposed connection means, one being shown at 18 and having inlet and outlet ports 20 which define a straight through flow passage for flow of fluid through the valve. The valve body 12 defines an internal valve chamber 22 within which is located a spherical valve element 24 defining a spherical external sealing surface and having a flow passage therethrough being defined by a transverse bore of cylindrical configuration and having circular openings at each end thereof where the transverse bore has intersection with the spherical sealing surface of the rotary spherical valve element. It should be borne in mind that the present invention need not be restricted to a valve of the ball valve type and that the invention is equally applicable to other valve types, such as rotary plug valves, sleeve valves, etc. without departing from the spirit and scope of this invention. The discussion herein particularly concerns use of the invention in connection with a ball valve configuration only to facilitate ease of understanding the invention. Also, it should be understood that the specific structure of the ball valve incorporating the present invention and shown and described in this specification is not intended to be taken as limiting the scope of the invention, it being within the scope of the invention to employ the flow controlling features hereof in valves of various other constructions as well. For example, the present invention is capable of being employed in virtually any type of valve having a fixed valve element and a movable valve element, where either or both of the valve elements is capable of being provided with a flow control aperture of the design and purpose that is described in detail hereinbelow.

For rotating the spherical valve element to the full open and fully closed positions thereof and to flow controlling positions between the open and closed positions, the valve is provided with a valve stem which extends through a stem passage of the valve body and is sealed with respect to the valve body by means of a suitable packing or sealing assembly. While the stem and ball may be designed and manufactured as an assembly of two or more pieces to facilitate manufacture and assembly, the discussion which follows will treat the stem and ball as one unit or functional assembly without necessarily detailing individual elements of such assembly.

As mentioned above, it is desirable to provide a flow control valve, particularly but not exclusively for controlled mixing of a fuel additive with a fuel during flow of the fuel from a bulk source to a receiving vessel such as a tank truck for ultimate delivery of the additized fuel to a customer. It is also desirable to provide a continuous flow type flow control valve which may be provided for controlling any suitable fluid such as a liquid, slurry or gaseous material and which, in a single controllable valve provides a very wide flow control range and the ability to smoothly control the opening, modulation, and closing of the valve in a manner that eliminates the hydraulic shock that is prevalent in many flow control systems for this general purpose.

Figures 2, 3:
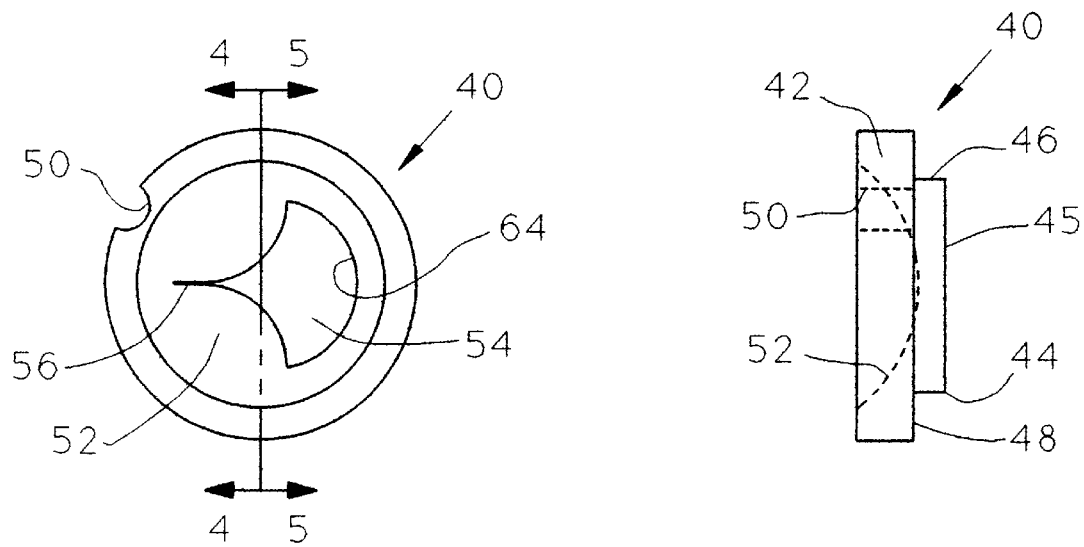
FIG. 2 is an elevational view of the flow controlling seat of the flow control valve of FIG. 1.
FIG. 3 is a side elevational view of the flow controlling seat of FIG. 2.
Figure 4:
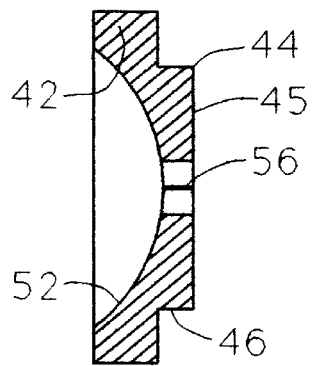
FIG. 4 is a sectional view of the flow controlling seat, taken along line 4—4 of FIG. 2.
Figure 5:
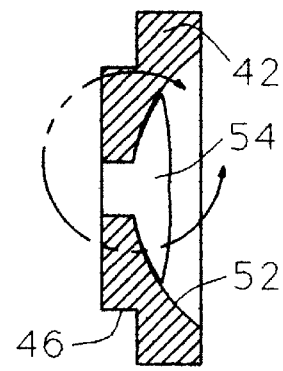
FIG. 5 is a sectional view of the flow controlling seat, taken along line 5—5 of FIG. 2.
Figure 6:
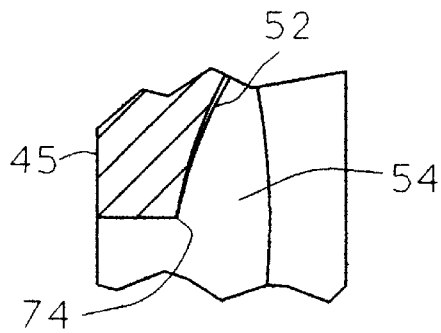
FIG. 6 is a fragmentary sectional view of the flow controlling seat of FIG. 5 which illustrates the intersection of the aperture and spherical internal surfaces of the seat.

Referring now to FIGS. 2 and 3, the valve mechanism 10 is provided with at least one flow controlling seat shown generally at 40, which is of generally circular, plate-like configuration and having a circular seat body and a cylindrical axial seat projection 44 which is received within a cylindrical seat recess of the valve body. The intersection of the cylindrical outer surface 46 of the axial projection 44 with the circular shoulder 48 of the seat body defines a circular recess which receives a circular sealing element such as an O-ring seal for maintaining sealing of the seat with respect to the valve body within which it is received. Externally, the seat body is machined to define a locator recess 50 of arcuate configuration which, as shown in FIG. 2, is located conveniently with respect to the horizontal. When the seat is positioned so that a locator is received within the locator recess, the seat is properly oriented with respect to the valve element and in particular with respect to the flow passage of the valve element.

For interfitting sealing engagement with the spherical sealing surface of the spherical valve element the seat body 42 is formed to define a concave spherical surface segment 52 having the essential sealing surface configuration and dimension of the valve element and adapted for sealing engagement therewith.

As mentioned above, it is desirable to provide a single controllable continuous flow valve having a very wide flow control range at varying differential pressure and having the capability for smoothly controlling the opening, modulation and closing of the valve to eliminate hydraulic shock. It is also desirable to provide a control valve that is capable of maintaining predetermined proportional control characteristics, i.e., a basic exponential flow characteristic of the form $K=CN^x$ permitting stable closed loop control and to provide for varying the flow characteristic in such a way as to enhance closed loop stability at higher flows, i.e., N may be controlled to decrease slightly with increasing opening. To permit simplicity of manufacture and to ensure repeatability and cost effectiveness of the control valve resulting from the manufacturing process it is further desirable to provide a flow control valve having one or more ported seats, wherein the configuration of the flow controlling port of the seats uses a simple round moving element fluid passage rather than a fluid passage of more complex configuration and uses simple radii and straight lines in stationary flow controlling element features rather than point-to-point interpolation. It should be recognized that this is only one embodiment of the invention and is primarily to facilitate manufacture in this illustration.

Figure 7:
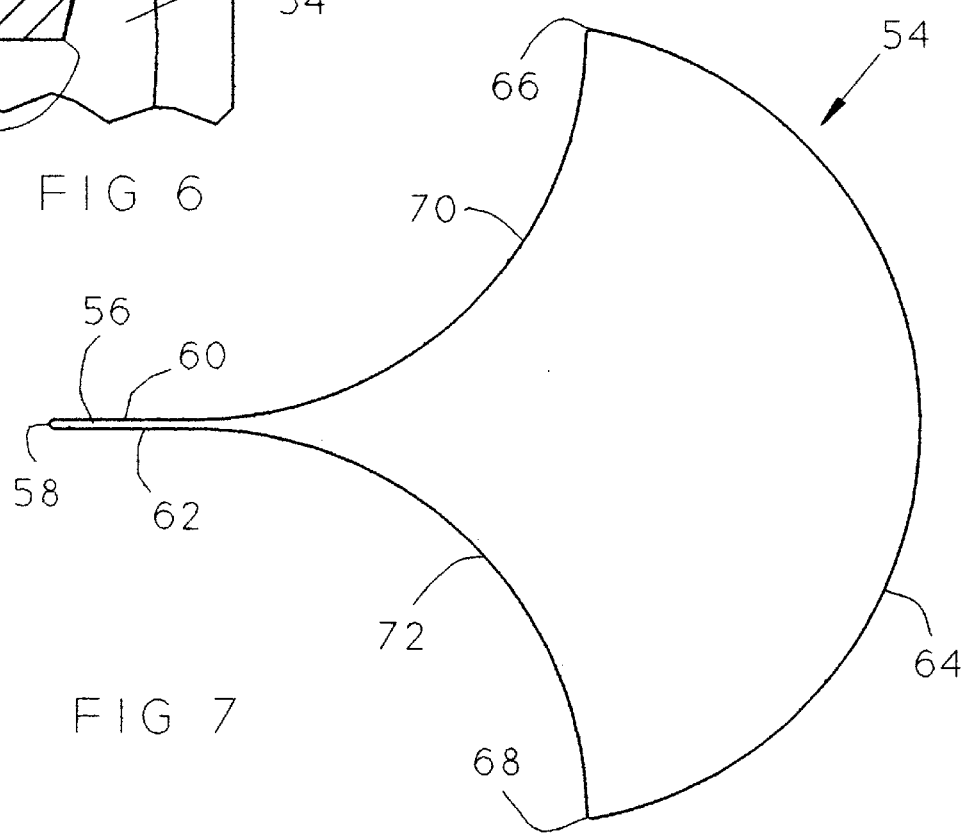
FIG. 7 is a pictorial illustration of the flow controlling opening of the seat of FIGS. 2–6.

Referring now particularly to the illustrations of FIGS. 2 and 7, the seat element of FIGS. 1–6 is machined to define a flow controlling port 54 which intersects the circular planar axial end surface 45 of the axial projection 44 and also intersects the concave spherical surface segment 52 of the seat. To facilitate minimal initial opening and closing of the valve in a manner to eliminate hydraulic shock and to allow very low flow rates the flow control aperture defines an elongate slot 56 having an arcuate end 58 and having parallel slot walls 60 and 62. The slot 56, which defines the small end of the flow control aperture, can be efficiently formed in a single forming process by wire EDM using wire having a diameter of less than the width of the slot. The large end of the flow control aperture, for maximum controlled flow of fluid through the valve at any fluid pressure setting is defined by an arcuate port surface 64, being of a dimension approximating half of a circular hole having a diameter comparable to the diameter of the flow passage through the ball. Preferably the narrow end of the slot has a width of much less than $\frac{1}{50}$th of the maximum width of the flow control aperture. The respective ends 66 and 68 of the arcuate port surface 64 have juncture with respective diverging curved port edge surfaces 70 and 72 which also have smoothly curved juncture with the respective slot surfaces 60 and 62, the curved port edge surfaces being defined by radii of circles of equal dimension. As shown in the partial sectional view of FIG. 6 the intersection of the flow controlling port 50 with the cylindrical surface segment 52 of the seat is defined by a relatively sharp edge 74.

Figure 8:
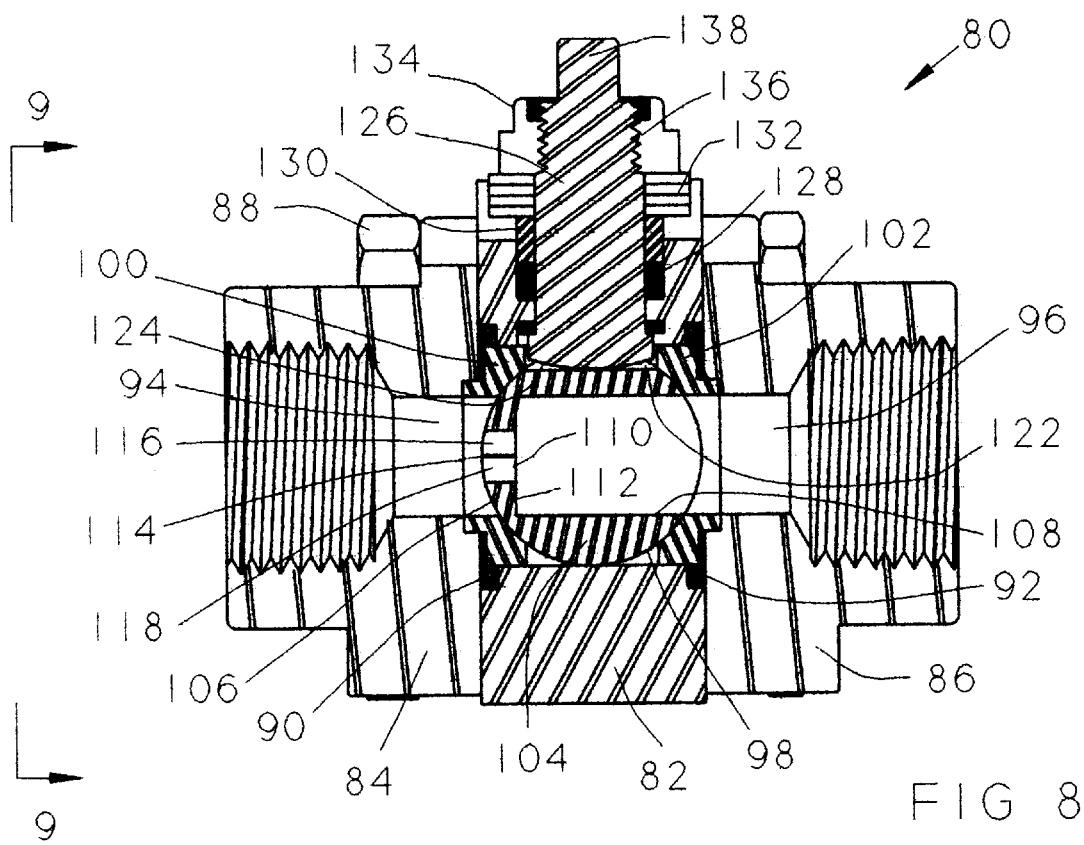
FIG. 8 is a sectional view of a ball valve constructed in accordance with the present invention and having a rotatable ball element defining a flow passage and having a flow control aperture constructed in accordance with this invention and communicating the flow passage of the ball element with the flow passage of the valve body.
Figure 9:
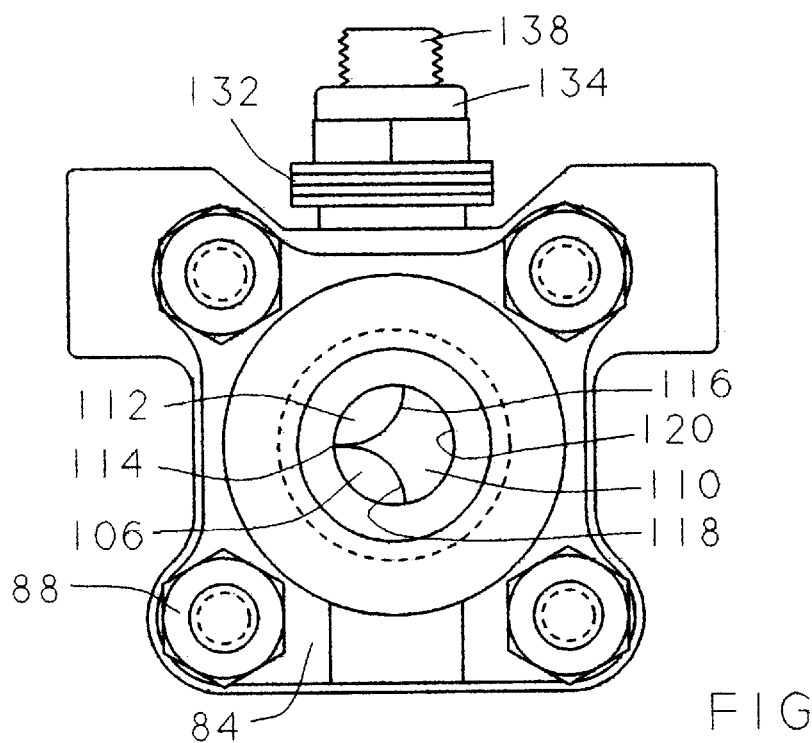
FIG. 9 is an elevational view of the ball valve of FIG. 8, being taken along line 9—9 of FIG. 8 and showing the flow control aperture of the valve in the full open position of the ball element.

Referring now to FIGS. 8 and 9, a flow controlling ball valve constructed in accordance with the present invention is shown generally at 80 and comprises a valve body 82 having body end connections 84 and 86 maintained in sealed assembly therewith by means of a plurality of body bolts 88. Sealing between the end connection body members 84 and 86 with respect to the valve body 82 is achieved by circular seals 90 and 92. The end members each define flow passage sections 94 and 96, respectively, which establish fluid flow communication with a valve chamber 98 located centrally of the valve body. A pair of circular seat members 100 and 102 are located within the valve chamber and are sealed with respect to the valve body and end members by the sealing elements 90 and 92.

For controlling the flow of fluid through the valve, a valve ball 104 is located within the valve chamber 98 and is positioned with its spherical sealing surface 106 in sealing engagement with both of the seat members 100 and 102. The valve ball defines a internal flow passage 108 having a dimension that corresponds to the dimensions of the flow passage sections 94 and 96. The flow of fluid between the flow passage section 108 and valve body flow passage section 94 is determined by the position of a flow control aperture 110 which is defined within a transverse wall section 112 of the valve ball element. The flow control aperture 110 is shown in its full open positions in both FIGS. 8 and 9. The flow control aperture is of the same essential configuration as is described above in connection with FIG. 7. The flow control aperture defines an elongate narrow slot 114 which opens to curved surfaces 116 and 118 defined by diverging radii. An arcuate surface 120, defining one wall or edge surface of the flow port 110 intersects the diverging curved surfaces 116 and 118 as is evident from FIG. 9.

For rotation of the valve ball element 104, with respect to the valve seats 100 and 102, the valve ball is provided with a drive slot 122 which is adapted to receive a non-circular drive head 124 located at the inner extremity of a valve stem 126. The valve stem extends through a packing gland located within the valve body and is sealed with respect to the valve body by means of a suitable stem seal packing 128 of the packing gland. The stem seal packing is secured within the packing gland by a circular packing retainer element 130 which is, in turn, secured by Belleville springs 132 that are retained about the valve stem by a valve stem retainer nut 134 having a threaded connection at 136 with a threaded outer end section of the valve stem 126. For mechanized rotation of the valve stem, the outer end of valve stem is provided with a non-circular drive element 138 to which can be connected an actuator having the capability of rotating the valve stem to any desired position and thus positioning the valve ball at a desired flow controlling position.

Although the valve ball element 104 is provided with a valve stem connection, it should be borne in mind an integral ball valve and stem may be employed.

In the closed position of the valve ball an unbroken portion of the spherical external surface 106 of the valve ball 104 is disposed in sealing engagement with the seat element 100 as well as the opposite seat element 102, thus preventing flow of fluid through the valve. When the controlled flow of fuel additive through the valve is desired, typically responsive to the flow of fuel from a bulk fuel facility, the valve ball element 104 is rotated by an actuator to an additive flow controlling position that is determined by such parameters as the viscosity characteristics of the additive, the additive pressure, the volumetric characteristic required by the customer, etc. As initial valve opening occurs the elongate slot portion 56 (see FIG. 7) of the flow control aperture 110 of the valve of FIGS. 8 and 9 will move past the sealing point of the valve ball with the seat 100, thus providing a flow passage between the valve passage 108 and the flow passage section 94 of the valve body, the flow passage having only the width of the slot, 0.003" for example, and having a length defined by the exposed length of the slot. Thus, initial flow through the valve will be minuscule at initial valve opening and, even under high fluid pressure, hydraulic shock to the piping system will be nil. As opening movement of the valve ball continues the dimension of the flow controlling opening will increase in proportion to the rotational movement of the valve ball.

Figure 10:
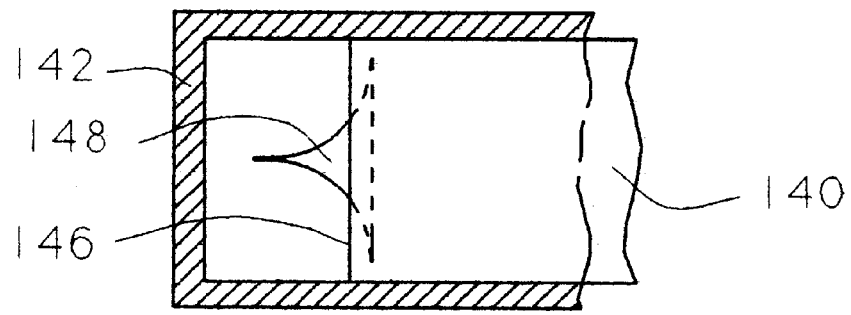
FIG. 10 is a diagrammatic illustration of flow control orifice defining elements of a valve such as a ball valve, gate valve, sleeve valve, plug valve and the like wherein the flow port of one valve element defines a straight edge having controlling relation with a specifically configured flow control port of a second valve element.
Figure 11:
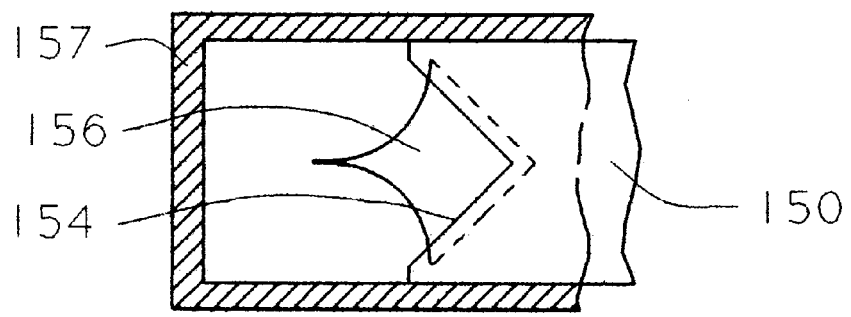
FIG. 11 is a diagrammatic illustration similar to that of FIG. 10 and showing the flow port of one valve element having a flow controlling edge controllably associated with a specifically configured flow control aperture.

Referring now to FIG. 10, a schematic illustration is provided showing the relatively movable flow control valve elements 140 and 142 of a flow control valve mechanism embodying the present invention. It should be borne in mind that either of the valve elements may be static with respect to the valve body and the other movable, or both of the valve elements may be movable. It is only necessary for valve control that the valve elements be disposed in relatively movable relation so that the flow port of one valve element is movable relative to the flow control aperture of the other valve element. As is evident from FIG. 10 a flow port 144 of valve element 140 defines a straight flow control edge 146 which is controllably movable relative to a flow control aperture 148 of valve element 142. The flow control aperture 148 is of the configuration and purpose discussed in detail in connection with FIGS. 6 and 7.

As a further alternative, a flow control valve element 150 is shown to define a controlling edge 154 which is disposed in relatively movable flow controlling relation with a flow control aperture 156 of a valve element 157, also being of the configuration and purpose discussed above in connection with FIGS. 6 and 7.

Figure 12:
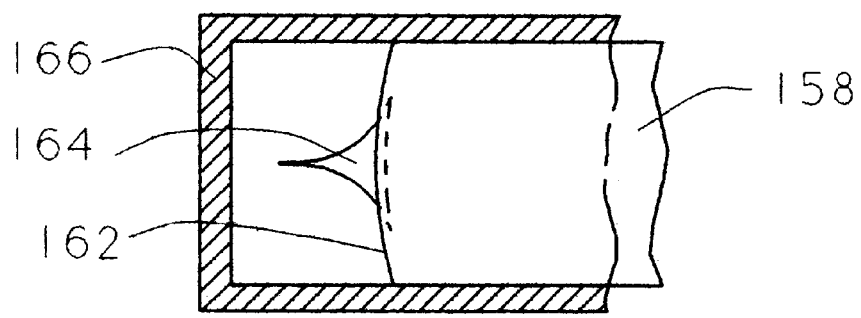
FIG. 12 is a diagrammatic illustration similar to that of FIG. 10 and showing the flow port of one valve element having a flow controlling edge of conversely curved configuration as compared to the flow port configuration of FIGS. 1, 2, 8 and 9.

Referring to FIG. 12, a further alternative is shown wherein a flow controlling valve element 158 is provided with a port edge 162 that is disposed in movable flow controlling relation with a flow control aperture 164 of a valve element 166, also being of the configuration and purpose discussed above in connection with FIGS. 6 and 7.

Figure 13:
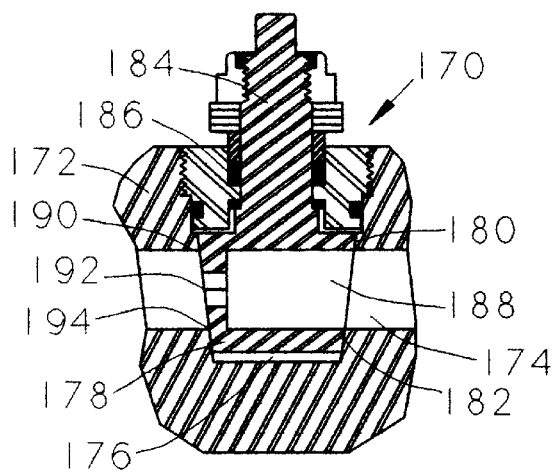
FIG. 13 is a partial sectional view showing a rotary plug valve incorporating the features of the present invention.

As mentioned above, the present invention may take a number of forms without departing from the spirit and scope of this invention. As shown in FIG. 13 a rotary plug valve 170 is shown to define a valve body 172 defining flow passages 174 intersected by a valve chamber 176. A rotary plug element 178 is positioned for rotation within the valve chamber and defines an external plug sealing surface 180 having sealing relation with a valve chamber surface 182. The plug element is rotatable within the valve chamber to closed, full open and an continuous range of flow controlling positions by rotating a valve stem 184 of the plug element. The valve stem is sealed with respect to the valve body by a packing 186 that is secured in conventional manner within a packing gland that is defined by the valve body.

The rotary plug element defines a flow passage 188 terminating at a wall 190 of the plug element. A flow controlling aperture 192 is defined in the plug wall 190 and is of the configuration and purpose discussed above in connection with FIGS. 7, 9 and 10. The flow controlling aperture is registerable, depending upon the position of the plug element, with the circular opening 194 that is defined by intersection of the flow passage 174 with the sealing wall 182 of the valve chamber 176.

Figure 14:
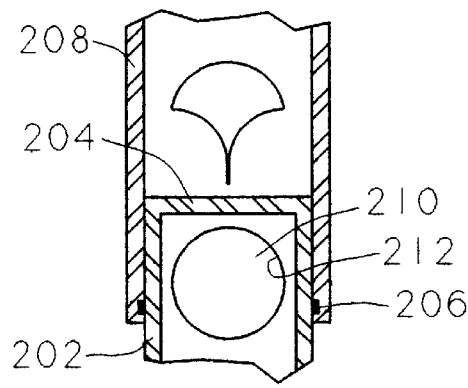
FIG. 14 is a partial sectional view showing a sleeve valve incorporating the features of the present invention.

As shown in FIG. 14, a flow controlling sleeve valve is shown generally at 200 and comprises a pair of valve sleeve elements 202 and 204 which are disposed in telescoping relation and are sealed with respect to one another by a sealing element 206. The sleeve element is closed at its inner end by a transverse wall and defines a flow port 210 having an edge 212. Though the sleeve elements 202 and 204 are shown to have relative linear movement for flow controlling positioning, it should be borne in mind that the sleeve elements may be adapted for relative rotation for flow controlling positioning if desired. One of the valve sleeve elements may be fixed and the other movable for flow control or both of the valve sleeve elements may be movable if desired. It is only necessary that the valve sleeve elements be relatively movable for their flow controlling positioning.

Figure 15:
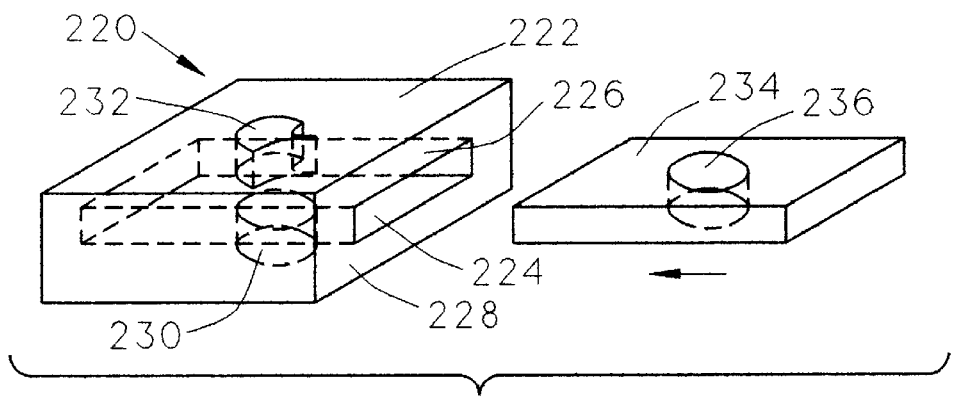
FIG. 15 is an exploded isometric illustration of a slide valve constructed in accordance with the teachings of this invention and showing a flow controlling aperture defined by the valve body and a flow port being defined by the slide element.
Figure 16:
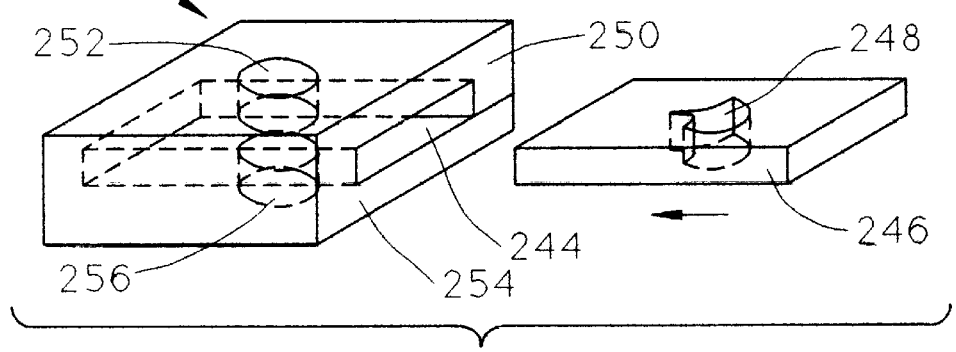
FIG. 16 is an exploded isometric illustration of a slide valve embodying the features of the present invention and showing a flow controlling aperture defined by the slide element and a flow port being defined by the valve body.

Referring now to FIGS. 15 and 16 the flow controlling features of the invention may be embodied in a slide valve mechanism. As shown in FIG. 15 a slide valve is shown generally at 220 having a valve body 222 defining a slide passage 224 extending therethrough and defining body plates 226 and 228. Body plate 228 defines a flow passage 230 while the opposed body plate 226 defines a flow controlling aperture of the configuration and purpose as discussed in connection with FIGS. 7, 9 and 10. Flow through the valve is identified by flow arrows. For fluid flow control a slide element 234, of a configuration and dimension corresponding to the configuration and dimension of the slide passage 224, is received within the slide passage and is sealed with respect to the valve body. The slide element is provided with a flow port that is positionable in fluid flow controlling coincidence with the flow control aperture 232. The slide and valve housing are relatively movable for establishing desired flow controlling coincidence of the flow port with the flow controlling aperture and to thus define an effective orifice dimension to permit a desired rate of fluid flow through the valve.

As shown in FIG. 16 a slide valve is shown generally at 240 having a valve body 242 of the same configuration as shown in FIG. 15. The valve body defines a slide passage 244 for receiving a slide element 246 which defines a flow controlling aperture 248 of similar configuration and purpose as compared with aperture 232 of FIG. 15. The valve body defines an upper body plate section 250 having a flow port 252 defined therein and defines a lower body plate section 254 having a flow passage 256. The flow controlling aperture of the slide plate 246 is positionable in infinitely variable coincidence with the plate openings 252 and 256, depending on the relative position of the slide plate with the valve body, thus providing an effective flow controlling orifice dimension for controlling the rate of flow through the valve. Though the flow ports 252 and 256 of the valve body are shown as being of circular configuration, it should be borne in mind that the flow ports may be of any other suitable configuration that permits effective flow controlling coincidence with the flow control aperture 248.

As mentioned above, valve elements defining flow controlling apertures have been manufactured by the inventors using an EDM manufacturing technique where the flow controlling aperture is cut in the valve element. A flow control range of 70,000:1 was achieved using the EDM manufacturing technique. Alternatively, the inventors have developed an alternative techinque for manufacturing a valve element, where it be a fixed valve seat or a moveable valve element having a flow controlling aperture defined thereby. It has been determined that by manufacturing valve element sections, so that each section defines a portion of the flow controlling aperature and by then assembling the sections in fixed relation, a flow controlling aperture may be simply and efficiently defined having an exponential flow controlling range that extends over substantially the entire flow control range of the control valve and would allow the flow control range to significantly exceed the 70,000:1 range that has been achieved the EDM manufacturing techinque.

Figures 17, 18:
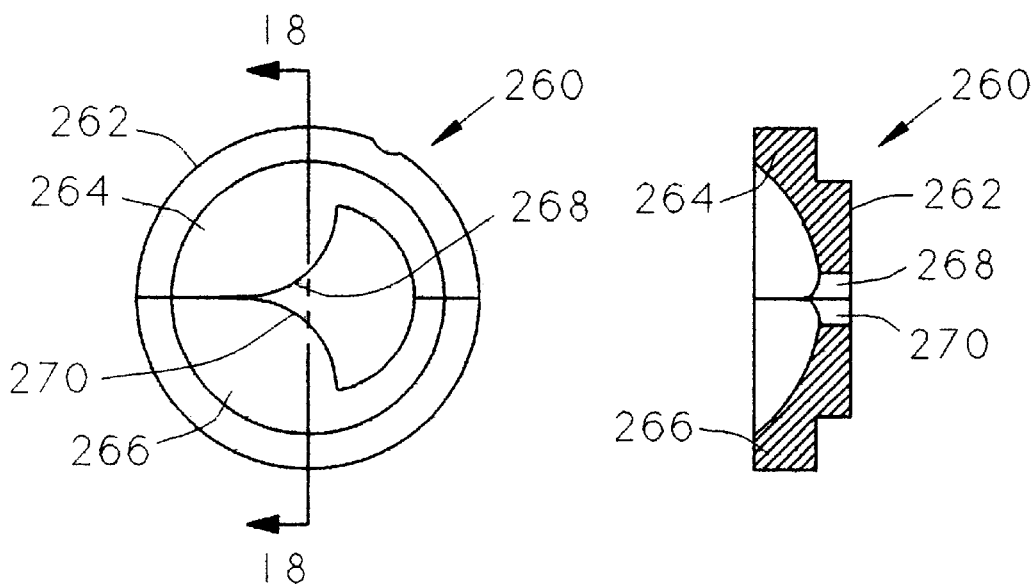
FIG. 17 is an elevational view of a ball valve seat comprising two seat sections maintained in assembly and defining a flow controlling aperture according to the present invention.
FIG. 18 is a sectional view taken along line 18—18 of FIG. 17.

Referring now to FIGS. 17 and 18, a valve seat for a ball valve is shown generally at 260 which comprises a seat blank 262 which is cut along line a—a or is formed as two halves, the intended longitudinal axis of the flow controlling aperture, to define a pair of seat sections 264 and 266 which are shown to be seat halves. The seat halves are then lapped to fit closely together and are secured in precise interfitting relation, such as by pinning or fixturing to align their relative positions and are then shaped to near their final interior/ exterior form. The seat halves are then separated and corresponding sections of the flow control aperture are then formed in the respective seat halves. Typically, the seat halves will be formed with half of the aperture configuration in each seat section of the blank so that the narrow end of the flow control aperture is defined by substantially tangential intersection of opposed curved aperture edges as shown at 268 and 270 at line a-a. Thus, with the small end of the flow controlling aperture defining a very narrow flow controlling slot end at a sharp point, the flow control range of the resulting flow control aperture will permit repeatable flow control throughout substantially the entire range of orifice opening thus allowing the flow control range of the valve to significantly exceed the 70,000:1 range that the inventors achieved through use of the EDM manufacturing technique. After the aperture configurations have been formed, the seat sections are then reassembled and secured or functionally connected by any suitable means such as pinning, welding, diffusion bonding, brazing, adhesive bonding, etc., so as to define an integral valve element having a flow control aperture therein of the configuration and purpose described herein. Preferably, the seat halves will be joined by diffusion bonding and then coined to true spherical diameter. It is envisioned that this technique will significantly enhance the productivity of the manufacturing process for aperture formation and will also minimize manufacturing costs.

Figures 19, 20:
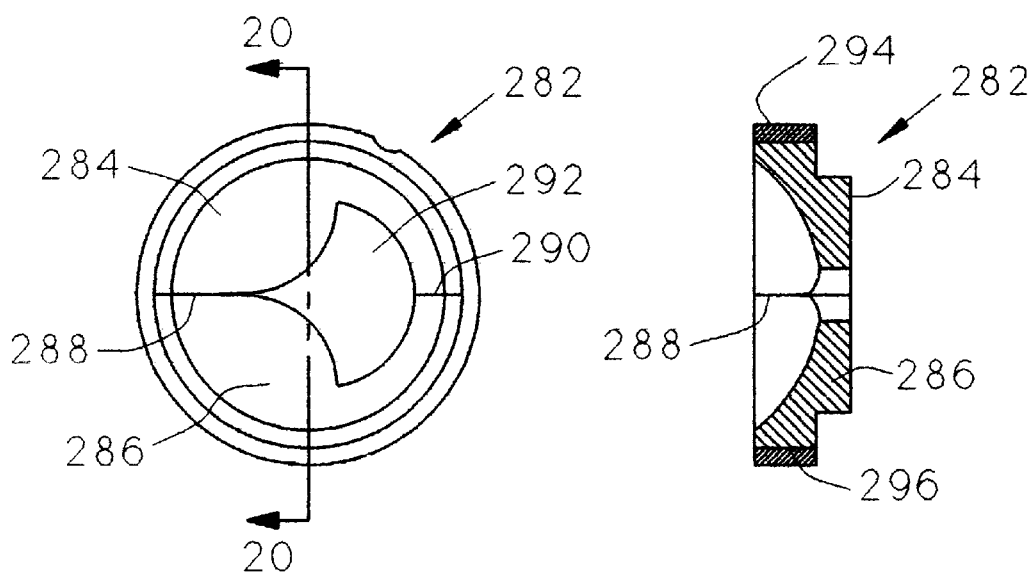
FIG. 19 is an elevational view similar to that of FIG. 17 and showing a ball valve seat comprised of assembled seat sections secured in assembly by a retainer ring and defining a flow controlling aperture according to the present invention.
FIG. 20 is a sectional view taken along line 20—20 of FIG. 19.

Referring now to FIGS. 19 and 20, a valve seat similar to seat 260 of FIGS. 17 and 18 is shown generally at 282 and comprises seat sections or halves 284 and 286. During manufacture the seat blank is cut or formed as two halves along line a—a, the long axis of the intended flow control aperture, and the seat halves are then ground and lapped to provide flat mating and sealing surfaces at 288 and 290. Opposed sections of the flow control aperture 292 are then formed in the respective seat halves, such as by grinding, broaching, milling or by any other suitable manufacturing process. After the seat halves have been properly formed, the seat halves will be aligned and a retainer collar 294 will be heat shrunk or pressed around the outer peripheral surface 296 that is defined by the interfitting seat halves. Any other suitable means may be alternatively employed for securing the seat halves in immovable assembly.

In view of the foregoing it is evident that the present invention is one well adapted to attain all of the objects and features hereinabove set forth, together with other objects and features which are inherent in the apparatus disclosed herein.

It should be apparent to anyone viewing the Figures, or having used, as an illustration, conventional valves such as ball, plug, sleeve, or even gate valves, or virtually any other valve configuration that many such valves actually have two flow controlling orifices that change as the movable element is moved and that it is the composite effect of both orifices that produce the total flow versus movement characteristic. Thus, the two orifices could be so designed so that one controlling orifice dominates the effect of the other or both can be designed to operate cooperatively with each other to produce the desired composite exponential characteristic. Indeed, it may be anticipated that a valve construction may be devised in which three or four or more orifices can be devised or linked to produce a desired flow characteristic.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

What is claimed is:

1. A wide range proportional flow control valve, comprising:

(a) means defining at least two relatively movable intersectable flow passages;

(b) when said flow passages are moved relative to one another, the area of intersection is varied, and flow is controlled from a minimum to some maximum;

(c) said flow control exhibiting substantially exponential flow change with linear relative movement of said intersectable flow passages over the entire range of operation above minimum and below maximum;

(d) where said substantially exponential flow change is defined as flow=$CN^x$, where C is a constant, N is the new orifice area/old orifice area per positive unit increment of relative movement, as, and x is an increment of movement relative to an initial position; and (e) where said flow passage intersections cooperate to provide an effective aperture having the appearance of a narrow slot rapidly diverging at one end.

2. The wide range proportional flow control valve of claim 1, comprising:

said exponential flow control being approximated over a substantial flow range by employing an effective aperture consisting of a gently diverging elongate slot and a wide diverging portion.

3. The wide range proportional flow control valve of claim 2, comprising:

said exponential flow control being approximated over a substantial flow range by employing an effective aperture consisting of an elongate slot and two appropriately located radii effecting a wide diverging portion.

4. The wide range proportional flow control valve of claim 1, comprising:

said exponential flow control being approximated over a substantial flow range by employing an effective aperture consisting of a parallel sided elongate slot and a wide diverging portion.

5. The wide range proportional flow control valve of claim 4, comprising:

said exponential flow control being approximated over a substantial flow range by employing an effective aperture consisting of an elongate slot and two appropriately located radii effecting a wide diverging portion.

\* \* \* \* \*